United States Patent
Scannell

[11] 3,810,639
[45] May 14, 1974

[54] FRANGIBLE BACKUP RING FOR SEALING RINGS

[75] Inventor: John B. Scannell, Long Beach, Calif.

[73] Assignee: Parker-Hannifin Corporation, Cleveland, Ohio

[22] Filed: Aug. 31, 1972

[21] Appl. No.: 285,182

[52] U.S. Cl.......... 277/188, 277/117, 277/DIG. 10, 277/9.5
[51] Int. Cl............................................. F16j 15/24
[58] Field of Search .......... 277/188, 117, 125, 237, 277/9, 9.5

[56] References Cited
UNITED STATES PATENTS
3,195,907  7/1965  Eckenrod.......................... 277/237

Primary Examiner—Samuel B. Rothberg
Assistant Examiner—Robert I. Smith
Attorney, Agent, or Firm—John N. Wolfram

[57] ABSTRACT

An anti-extrusion backup ring for use on the downstream side of a sealing ring which is manufactured and installed as one piece and will fracture at a fluid pressure magnitude less than that which will cause extrusion of the sealing ring whereby two or more anti-extrusion rings are formed which function independently of each other to prevent extrusion of the sealing ring at two or more different locations, such as at the ID and OD of the sealing ring.

3 Claims, 5 Drawing Figures

FRANGIBLE BACKUP RING FOR SEALING RINGS

BACKGROUND OF THE INVENTION

The use of two backup rings which move independently and can be forced against relatively moving parts by an elastomeric sealing ring to provide anti-extrusion protection for the sealing ring at the ID and OD is well known.

The use of a single backup ring as a less effective anti-extrusion device is also well known. However, the one-piece ring has advantages over the use of two rings. A one-piece ring requires less machining because it has less surface area than two rings of the same volume. Also, the one-piece ring may be stored, handled and installed with considerably less effort.

The use of two rings has inherent advantages over the use of a one-piece ring. To achieve the same anti-extrusion efficiency as the double ring, the one-piece ring must be machined to such a tolerance to fit precisely between the ID and OD that it is prohibitive in cost and very difficult to assemble. While the two-ring device can move independently to be pressed against the ID and OD by the sealing member, the one-piece ring is rigid causing the force thereon from the sealing member to be unused. Consequently, the one piece can't compensate for wear of the relatively moveable member as can the two-ring device.

SUMMARY OF THE INVENTION

The above shortcomings of the previous designs have been overcome and the advantages combined by providing a backup ring which does not require machining to close ID and OD tolerances, may be manufactured and installed in one piece and will fracture, at a system fluid pressure less than the pressure which will cause extrusion of the sealing member, to form two independently acting anti-extrusion rings moveable by fluid pressure acting on the sealing member to force the rings into engagement with the relatively moveable members, thus also compensating for wear of the members or rings.

DETAILED DESCRIPTION

Figure 1:
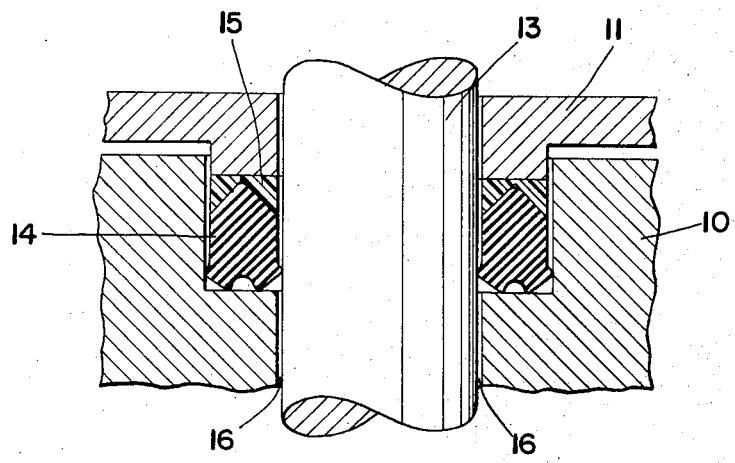
FIG. 1 is a cross sectional view of the seal assembly of a hydraulic cylinder utilizing the present invention.

The present invention may be used in a hydraulic cylinder to prevent fluid escape as shown in FIG. 1. The cylinder body 10, retainer ring 11, and shaft 13 compress and confine the sealing ring 14 and backup ring 15. Fluid pressure enters the seal assembly via clearance 16 and acts upon the sealing ring forcing it toward the backup ring.

Figure 2:
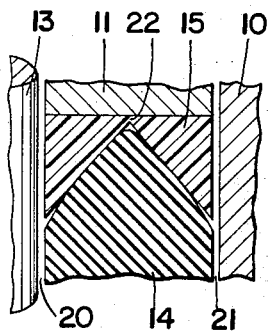
FIG. 2 is an enlarged cross sectional view of the seal assembly of FIG. 1 under zero system pressure.

FIG. 2 shows the sealing ring and backup ring under zero system fluid pressure. Under these conditions, there are clearances at 20 and 21. The backup ring has at least one point of thin cross section 22 designed to fracture under fluid pressure which is lower than the pressure required to extrude the sealing ring 14 into clearances 20 and 21.

Figure 3:
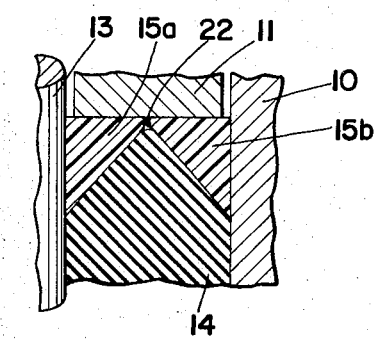
FIG. 3 is an enlarged cross sectional view of the seal assembly of FIG. 1 after system pressure has fractured the backup ring.

FIG. 3 shows the backup ring 15 after fracture into segments 15 a and 15 b. The fluid pressure exerted on sealing ring 14 has deformed it so that it contacts the body 10 and shaft 13. Fluid pressure has also been transmitted through the sealing ring 14 to force the segments 15 a and 15 b into engagement with the shaft 13 and body 10 respectively to fill clearances 20 and 21 respectively and thus preclude extrusion of the sealing ring therein. The backup ring segments will also function as sealing rings due to the fluid pressure forcing them into engagement with the relatively moveable members, shaft 13 and body 10. Thus the segments also compensate for their own wear as well as that of the shaft and body.

The anti-extrusion segments will function separately depending upon the wear at their point of contact with the shaft or body. The pressure exerted by the segments upon the shaft or body will be a function of the system pressure thus minimizing wear.

Figure 4:
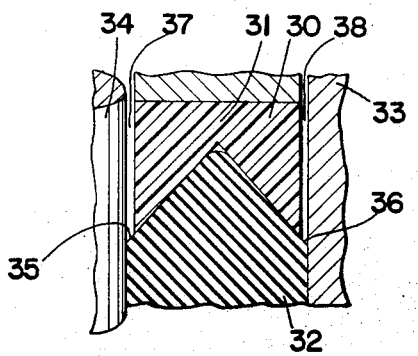
FIG. 4 is an enlarged cross sectional view of a prior art design under moderate system pressure.

The backup ring 30 shown in FIG. 4 is one form of prior art. The thinnest point 31 is not designed to fracture under operating conditions. Thus as pressure increases the sealing ring 32 will begin to compress axially and expand to contact the body 33 and shaft 34. As the sealing ring is being compressed against the backup ring extrusion begins at points 35 and 36 into clearances 37 and 38 respectively.

Figure 5:
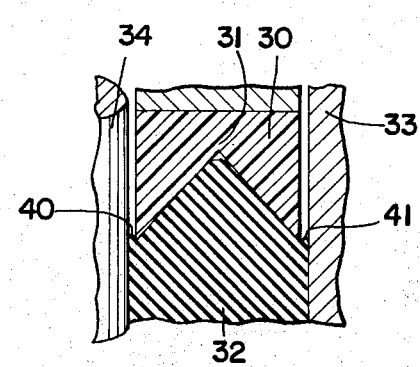
FIG. 5 is another view of the prior art design of FIG. 4 but where there is high system pressure causing extrusion of the sealing ring.

In FIG. 5, damaging extrusion has occurred at points 40 and 41. This extrusion causes permanent damage to the sealing ring 32 and impairment of its sealing ability.

The backup ring disclosed herein is preferably made of plastic material that is tough and relatively hard as compared to rubber, and which will fracture cleanly under the applied stress. One such material is a polymer manufactured by the Polymer Corporation under the trade name Nylatron GS. The backup ring may be made in a variety of shapes and forms wherein it may form two or more anti-extrusion rings.

Mechanical loading may also be used to fracture the backup ring after is has been manufactured and installed as one piece.

I claim:

1. A sealing assembly for use in an annular packing chamber formed between telescoped inner and outer members and wherein one of said members provides a transverse end wall for the chamber, said assembly comprising a backup ring of relatively hard but frangible material and a packing ring of resilient material softer than said frangible material, said backup ring having one end engageable with said end wall and having an annular generally V shaped recess extending axially into the backup ring from its other end, said backup ring having a thin cross section at the bottom of the recess and being devoid of circumferentially spaced slots, said packing ring having one end extending into said recess, said backup ring being of such strength at said thin cross section that upon application of a predetermined fluid pressure to the other end of said packing ring, said packing ring will be forced tightly against said backup ring within said recess and cause the backup ring to fracture only at said thin section to form separate radially inner and outer backup ring portions each of which has continuous inner and outer diameters.

2. The assembly of claim 1 in which said backup ring has an initial radial thickness between its inner and outer diameters that is less than the radial width of the chamber and after fracture of said backup ring the inner portion thereof will be movable against the inner member and the outer portion will be movable against the outer member.

3. The assembly of claim 2 in which the radial width of said recess at said other end of the backup ring is substantially the same as the radial width of said other end of the backup ring whereby to form substantially sharp corners between the recess and the inner and outer diameters of said backup ring.

* * * * *